United States Patent [19]

Lissau

[11] Patent Number: 4,544,046
[45] Date of Patent: Oct. 1, 1985

[54] OVER-THE-ROAD VEHICLE AUTOMATIC SLACK ADJUSTER

[75] Inventor: Frederic Lissau, Chicago, Ill.

[73] Assignee: Sloan Valve Company, Franklin Park, Ill.

[21] Appl. No.: 555,647

[22] Filed: Nov. 28, 1983

[51] Int. Cl.[4] .............................................. F16D 65/56
[52] U.S. Cl. ............................................... 188/79.5 K
[58] Field of Search ........ 188/79.5 K, 196 B, 196 BA

[56] References Cited

U.S. PATENT DOCUMENTS

| | | | |
|---|---|---|---|
| 1,661,191 | 3/1928 | Midboe | 188/79.5 K |
| 2,920,724 | 1/1960 | Margetic et al. | 188/79.5 K X |
| 3,361,230 | 1/1968 | Hildebrand et al. | 188/79.5 K |

*Primary Examiner*—Duane A. Reger
*Attorney, Agent, or Firm*—Kinzer, Plyer, Dorn & McEachran

[57] ABSTRACT

An automatic slack adjuster for over-the-road vehicle brakes is adapted to be mounted between the brake chamber and brake operating shaft, for example an operating shaft known as an S cam shaft. The slack adjuster includes a body having a lever arm pivotally mounted thereto, which lever arm is connected to the brake chamber through a brake operating rod. A drive member is fixed onto the brake operating shaft and is movably positioned within the body. There is an adjustable connection between the lever arm and the drive member for adjusting the relationship between the drive member and body in response to the body movement required for a brake application. The adjustable connection provides for incremental adjustment and includes a spring compressed by movement of the lever arm when slack is sensed during brake application and providing the energy to cause slack adjusting relative movement between the drive member and body during brake release.

12 Claims, 2 Drawing Figures

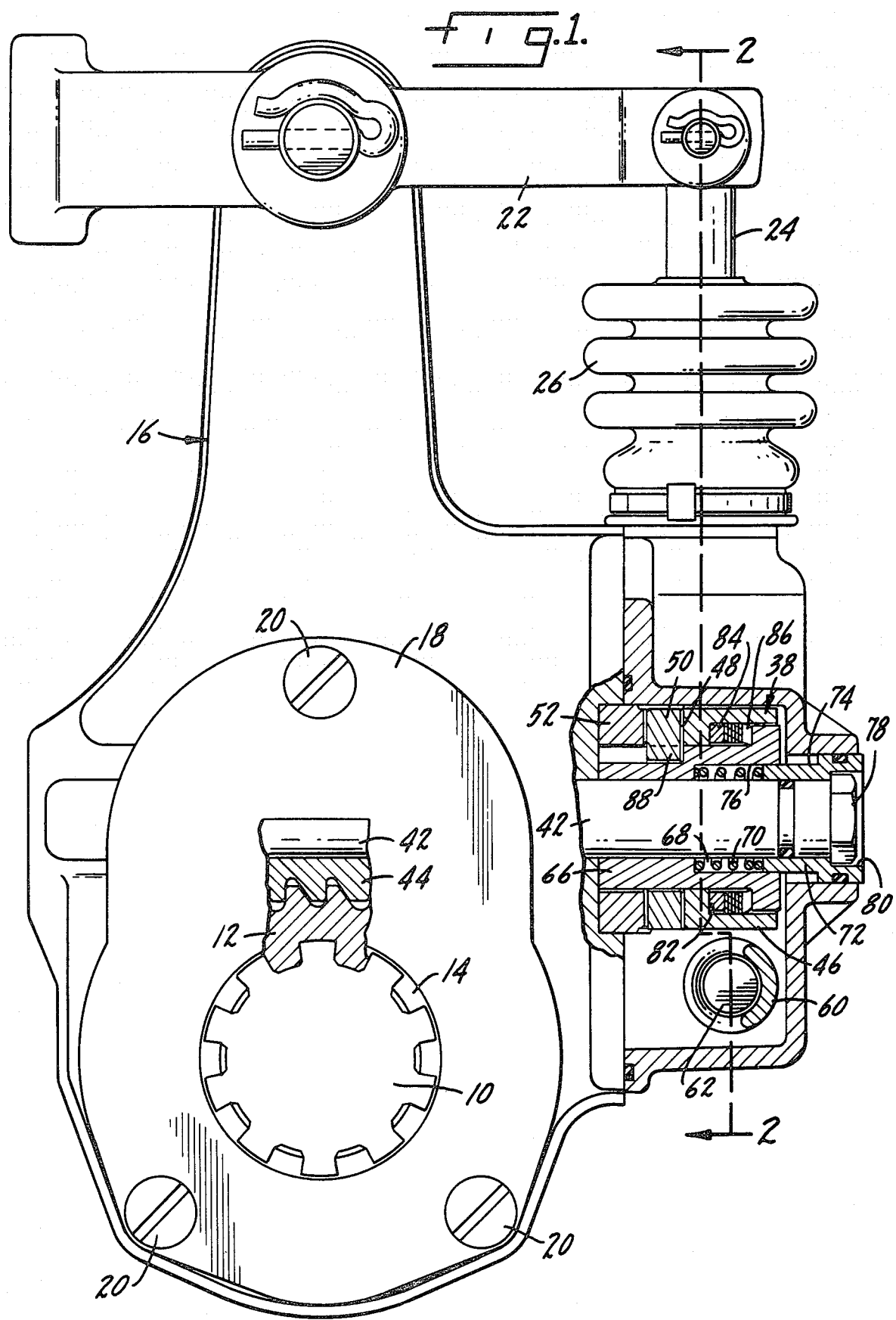

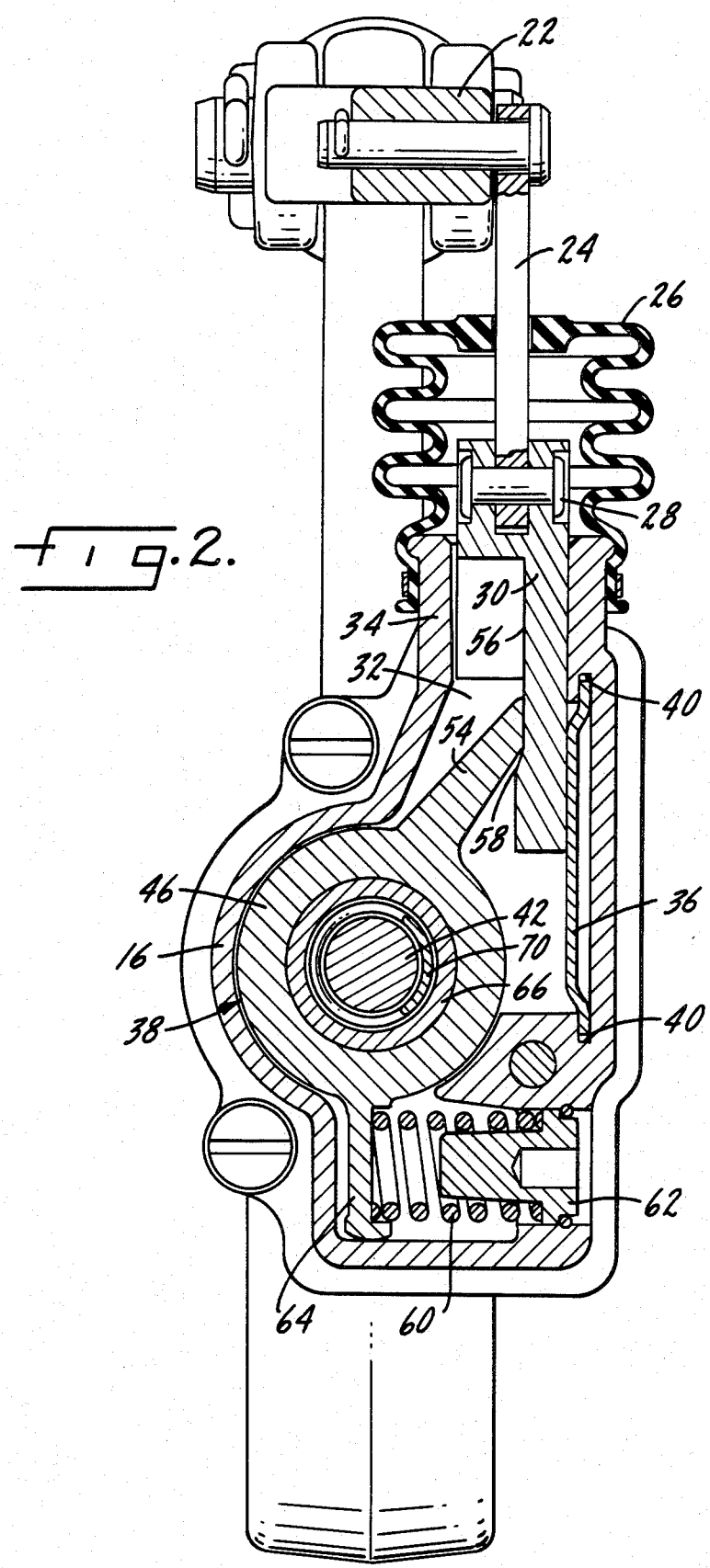

4,544,046

OVER-THE-ROAD VEHICLE AUTOMATIC SLACK ADJUSTER

SUMMARY OF THE INVENTION

The present invention relates to slack adjusters for use in over-the-road vehicles such as trucks or the like and has particular relation to such a slack adjuster providing for incremental movement and using a spring as an energy source to provide for adjustment movement.

Another purpose is a brake slack adjuster of the type described which is simply constructed and reliably operable.

Another purpose is a brake slack adjuster for the described environment in which linear movement of the brake lever arm is translated to rotary movement of an adjustment member, which rotary movement compresses a spring providing the force for slack adjustment on the brake release cycle.

Another purpose is a brake slack adjuster of the type described utilizing a stepped cam as the means for providing incremental slack adjustment.

Other purposes will appear in the ensuing specification, drawings and claims.

BRIEF DESCRIPTION OF THE DRAWINGS

The invention is illustrated in the following drawings wherein:

FIG. 1 is a side elevation of a slack adjuster of the type described, showing portions of the slack adjuster in section, and FIG. 2 is a section along plane 2—2 of FIG. 1.

DESCRIPTION OF THE PREFERRED EMBODIMENT

One of the principal problems in automatic slack adjusters of the type in use today on over-the-road vehicles such as trucks or the like is that the slack adjuster may not differentiate between wear on the brake drum and brake drum expansion from overheating. A take-up of slack which appears to be caused by wear, but which in fact is caused by expansion of the brake drum due to heat can cause subsequent improper operation of the brakes. The present invention solves the problem of differentiation between actual slack caused by brake drum wear and brake drum expansion due to overheating by limiting the amount of slack which may be taken up on any one brake operation. Thus, brake drum wear which will be gradual in nature, can be accomodated by the amount of slack permitted to be taken up in a single brake application. Whereas, expansion of a brake drum caused by overheating, which would be a more abrupt change of the brake drum diameter than that caused by brake drum wear, will not bring about an adjustment by the slack adjuster in an amount more than the increment permitted by the structure disclosed herein. The amount of slack which can be taken up on any one brake application is limited by the cam structure which in turn provides for a single increment of slack take-up, regardless of the amount of slack sensed during a brake application.

In the drawings, a shaft is indicated at 10 and is the brake operating shaft of a conventional over-the-road vehicle brake system. The shaft 10 may be what is known in the trade as an S cam shaft in reference to the manner in which the shaft brings about operation of the brakes. A drive member or worm gear 12 having a plurality of spaced inwardly-directed splines 14 is connected to shaft 10 with gear 12 being rotatably mounted within a body indicated generally at 16. A side cover plate 18 is mounted by screws or the like 20 to the body and seals may be inserted where required to protect the body interior.

The opposite end of body 16 from worm gear 12 pivotally mounts a yoke 22 which is journaled to the body and will conventionally be connected to or extend outwardly from the brake operating chamber. Yoke 22 is pivotally connected to a link 24 which forms the connection between the slack adjustment apparatus to be described and the yoke which functions as a lever arm.

Looking specifically at FIG. 2, link 24 is at least in part enclosed by a protective boot 26 with the link extending into the boot and being pivotally connected therein by a rivet or the like 28 to a sliding cam 30. Cam 30 will slidingly move within a chamber 32 defined by wall portions 34 of body 16, with the straight line movement of the cam being insured by a guide insert 36 and by an arm portion 54 of a preadjustment member 38. The guide insert 36 may be in the form of a plate which has its opposite ends inserted within slots 40 in the wall portions 34 of body 16.

Preadjustment member 38 is coaxially arranged within chamber 32 about a driving bushing or shaft 42, with the inward end of shaft 42 being in driving relationship with a worm 44 which is in engagement with worm gear 12. Accordingly, rotation of shaft 42 will rotate worm 44 which is effective to drive gear 12. Preadjustment member 38 has a cylindrical face portion 46 which has a plurality of ratchet teeth 48 thereon, which teeth are in mating engagement with ratchet teeth on an adjustment clutch 50 which is positioned adjacent the cylindrical portion of the preadjustment member. The ratchet between preadjustment member 38 and adjustment clutch 50 will permit counterclockwise rotation of preadjustment member 38 without any consequent rotation of adjustment clutch 50, but will not permit such movement in the clockwise direction. Positioned adjacent to adjustment clutch 50 is a clutch member 52 keyed to body 16, there being a similar ratchet arrangement between members 50 and 52 to the effect that member 50 will not rotate in a counterclockwise direction relative to clutch 52, but is permitted to rotate in a clockwise direction. Thus, the combination of the clutch members and the ratchet connection therebetween, as well as the ratchet connection with preadjustment member 38, provides a one-way clutch arrangement, the operation of which in slack adjustment will be described hereinafter.

Preadjustment member 38 has a cam arm 54 which rides against cam surface 56 of cam 30 and contact between cam arm 54 and a ramp 58 of cam surface 56 will be effective to cause counterclockwise rotation of preadjustment member 38.

Also positioned within chamber 32 and adjacent to preadjustment member 38 is a coiled spring 60 mounted upon a spring support 62 and positioned for contact by a spring arm 64 of preadjustment member 38. Accordingly, when contact between ramp 58 and cam arm 54 causes counterclockwise rotation of preadjustment member 38, spring 60 will be compressed, providing an energy source for subsequent slack take-up.

Coaxially positioned about shaft 42 is a locking bushing 66 which has an internal recess 68 mounting a small coaxially arranged coiled spring 70 which urges a bushing 72 outwardly from or away from the locking bushing. Bushing 72, also coaxially arranged about shaft 42, has an exterior multi-flatted surface 74 which may, for example, be octagonal in configuration, which mates with a similar octagonal surface 76 forming recess 68. Thus, the octagonal or mating mechanical surfaces 74 and 76 form a driving connection between locking bushing 66 and bushing 72.

Shaft 42 has a shaped head 78 which may, for example, be hexagonal and mates with a similar hexagonal interior surface 80 on that portion of bushing 72 which is positioned adjacent head 78. Accordingly, the mating hexagonal surfaces described form a driving connection between bushing 72 and shaft 42.

Formed between recessed areas of the exterior of bushing 66 and the interior of preadjustment member 38 is a chamber indicated at 82, in which are a spacer 84 and a series of wave washers 86 which function to urge the preadjustment member and the locking bushing in opposite directions and to maintain firm contact between the described ratchet surfaces between preadjustment member 38, adjustment clutch 50 and clutch member 52.

The structure is completed by a number of seals, which are not specifically designated herein, but which will be provided at conventional locations to perform the customary sealing functions in devices of this type. Those skilled in the art will readily appreciate the function and location of seals in a slack adjuster of this type.

In operation, when the brakes are applied the brake chamber will have an increase in air pressure, permitting the brake chamber to cause movement of its associated brake rod which may be connected to yoke 22. Body 16 accordingly will be pivoted in a clockwise direction to transmit corresponding clockwise movement through worm gear 12 to S cam shaft 10 to apply the brakes. As body 16 moves in a counterclockwise direction, link 24 will be moved upward which will cause cam 30 to rise. Such rising movement of cam 30, depending upon where on ramp surface 56 cam arm 54 is located, may or may not cause counterclockwise rotation of preadjustment member 38. In a normal brake application, there is the force required to fully apply the brakes, to provide for complete contact between the brake drums and the associated brake shoes. Normally, there is also a brake application period described as the wrap-up, after full contact between the brake members, in which the brake application member, in this case yoke 22, will apply a degree of stress or strain to the various elements comprising the brake application mechanical system. Assuming preadjustment member 38 has little or no contact with ramp 58, there has been no slack sensed in the system and upon release of the brakes and brake wrap-up, all of the elements will return to their initial position.

If during a brake application cam 30 has moved a distance sufficient to cause cam arm 54 to contact and perhaps ride partially up ramp 58, there will be consequent counterclockwise movement of preadjustment member 38 and compression of spring 60. Rotary movement of preadjustment member 38 will cause this member to move relative to adjustment clutch 50. The teeth on the ratchet connection between these two members corresponds to the increment of rotary movement provided by a movement of cam arm 54 completely up ramp 58 and onto the adjacent portion of cam surface 56. If preadjustment member 38 and its cam arm 54 only move a portion of the distance up ramp 58, there will be insufficient movement of the preadjustment member to move through one incremental step of the ratchet permitted movement between the preadjustment member and adjustment clutch 50. Accordingly, during the release cycle, the preadjustment member will return to its initial position and no slack will be taken up.

If during brake application cam arm 54 rides completely up ramp 58 and onto the adjacent cam surface, the consequent rotary movement of preadjustment member 38 will cause the preadjustment member to move one increment or over one tooth of adjustment clutch 50. Adjustment clutch 50 will not move nor will clutch 52 which is keyed to body 16. Such counterclockwise movement of adjustment member 38 will compress spring or energy source 60. Regardless of the travel of cam 30, preadjustment member 38 will not rotate more than the movement provided by ramp 58, thus limiting the amount of subsequent slack take-up.

During brake release and subsequent to the period when the brake mechanism is under load due to the wrap-up effect of the brake application torque, spring 60 will move preadjustment member 38 in a clockwise direction, once ramp 58 of cam 30 has moved a distance such that the preadjustment member can move in a clockwise direction. Such clockwise rotation of preadjustment member 38 will drive adjustment clutch 50, which is keyed, as at 88, to locking bushing 66. Accordingly, locking bushing 66 will rotate in the same direction and through the described driving connection of bushing 72 will cause rotation of shaft 42 and consequent movement of worm 44. Rotation of worm 44 will cause worm gear 12 to rotate relative to body 16 which has the effect of changing the relative position of the body and the worm gear which takes up slack.

The amount of slack adjustment on any one brake application is limited to the increment provided by ramp 58. The length of the ramp and the angle of the ramp relative to the direction of movement of the cam can be varied to control or regulate the amount of slack to be taken up. In addition, there may be one or more ramps or there may be several steps in the ramp, all to provide a control over the amount of slack taken up. Normally, the amount of movement of preadjustment member 38 derived from the ramp will be consistent with the one-way clutching provided between locking bushing 66 and adjustment clutch 50 by the described ratchet arrangement.

Manual slack adjustment is also provided, for example during installation or during the requirements of any mechanical maintenance of the vehicle. Such manual adjustment is brought about by moving bushing 72 inwardly, against the force of spring 70, until the bushing has cleared the hex head of shaft 42. Thereafter, shaft 42 may be mechanically turned, by the hex head thereon, an amount consistent with the desired adjustment of the slack. Such adjustment may be either to take up slack or let out slack.

Of importance is the use of coil spring 60 to provide the mechanical force or energy source to effect take-up of slack. Also of importance is the configuration of the ramp and the incremental adjustment provided thereby, which ramp may be varied as described to control the precise amount of slack take-up permitted during any brake application.

Whereas the preferred form of the invention has been shown and described herein, it should be realized that there may be many modifications, substitutions and alterations thereto.

The embodiments of the invention in which an exclusive property or privilege is claimed are defined as follows:

1. In an automatic slack adjuster for vehicle brakes and adapted to be mounted between the brake chamber and the brake operating shaft, a body, a drive member movable relative to and positioned by said body on the brake operating shaft, a lever arm pivoted to said body, an adjustable connection between said lever arm and drive member for adjusting the relationship between said drive member and body in response to the body movement required for a brake application, said adjustable connection including spring means compressed by movement of said lever arm when slack is sensed during brake application and providing the energy to cause slack adjusting relative movement between said drive member and body during brake release.

2. The slack adjuster of claim 1 further characterized in that said adjustable connection includes an adjustment member movable in response to lever arm travel and positioned to compress said spring means.

3. The structure of claim 2 further characterized by and including a cam mechanically translating movement of said lever arm into movement of said adjustment member, with said cam providing for incremental movement of said adjustment member.

4. The slack adjuster of claim 3 further characterized in that said cam translates linear movement of said lever arm into rotary movement of said adjustment member, with said cam including a single step providing incremental movement of said adjustment member.

5. The slack adjuster of claim 3 further characterized by and including a one-way clutch mechanically positioned between said adjustment member and said drive member, said clutch providing for incremental movement of said drive member in amounts substantially related to the incremental movement of said adjustment member.

6. The slack adjuster of claim 5 further characterized in that said one-way clutch includes ratchet means, with the travel permitted by one ratchet thereof being substantially the same as the incremental movement of said adjustment member.

7. The slack adjuster of claim 2 further characterized by and including one-way clutch means mechanically positioned between said adjustment member and drive member.

8. The slack adjuster of claim 7 further characterized by and including a shaft mechanically positioned between said adjustment member and drive member and mechanically connected to said one-way clutch, and means for disengaging said shaft from said clutch and for providing for manual adjustment of said shaft and drive member.

9. The slack adjuster of claim 8 further characterized in that said shaft is coaxially arranged relative to said adjustment member and is coaxially arranged relative to said one-way clutch means, with the means for disengaging said shaft from said clutch including a coaxially arranged bushing mounted on said shaft and forming the driving connection between said one way clutch means and said shaft.

10. The slack adjuster of claim 9 further characterized by and including spring means coaxially arranged relative to said shaft and normally urging said bushing toward a position forming a mechanical connection between said shaft and said one-way clutch means.

11. In an automatic slack adjuster for vehicle brakes and adapted to be mounted between the brake chamber and the brake operating shaft, a body, a drive member movable relative to and positioned by said body on the brake operating shaft, a lever arm pivoted to said body, an adjustable connection between said lever arm and drive member for adjusting the relationship between said drive member and body in response to the body movement required for a brake application, said adjustable connection including a stepped cam operable by said lever arm and providing incremental adjustment of said drive member, and spring means compressed by movement of said adjustment member and providing the energy to cause slack adjusting relative movement between said drive member and body.

12. The slack adjuster of claim 11 further characterized in that said adjustable connection includes an adjustment member, movement of said cam causing rotary movement of said adjustment member.

* * * * *